United States Patent [19]

Angleraud

[11] Patent Number: 4,749,619

[45] Date of Patent: Jun. 7, 1988

[54] HOLLOW FIBRE USEFUL IN BLOOD TREATING PROCESSES

[75] Inventor: René Angleraud, Feyzin, France

[73] Assignee: Hospal Industrie, Meyzieu, France

[21] Appl. No.: 94,045

[22] Filed: Sep. 8, 1987

Related U.S. Application Data

[63] Continuation of Ser. No. 768,002, Aug. 21, 1985, abandoned, which is a continuation of Ser. No. 508,024, Jun. 27, 1983, abandoned.

[51] Int. Cl.$^4$ ............................................. D02G 3/00
[52] U.S. Cl. ............................... 428/398; 210/500.23; 210/500.43; 428/376
[58] Field of Search ............... 428/364, 398, 376, 373, 428/400; 210/500.23, 500.22, 500.42, 500.43, 632.4, 638, 646, 651; 264/41

[56] References Cited

U.S. PATENT DOCUMENTS

| | | | |
|---|---|---|---|
| 4,056,467 | 11/1977 | Christen et al. | 428/398 |
| 4,173,606 | 11/1979 | Stoy et al. | 528/488 X |
| 4,252,652 | 2/1981 | Elfert et al. | 210/654 |
| 4,265,959 | 5/1981 | Sano et al. | 210/500.2 |
| 4,272,378 | 6/1981 | Sano et al. | 210/500.2 |

Primary Examiner—Lorraine T. Kendell
Attorney, Agent, or Firm—Gerald D. Sharkin; Robert S. Honor; Walter F. Jewell

[57] ABSTRACT

The invention provides semi-permeable hollow fibres of symmetrical type and of homogeneous microporous structure, with a smooth internal surface, which are obtained by cooling a solution of a copolymer of acrylonitrile and an olefinically unsaturated comonomer carrying optionally salified sulphonic acid groups, in a polar organic solvent with an adjuvant, to give a thermally reversible gel, followed by washing, stretching and relaxation treatments. The new hollow fibres have improved haemocompatibility and are useful in treating blood by haemodialysis, ultrafiltration and/or plasmapheresis.

6 Claims, 2 Drawing Sheets

HOLLOW FIBRE USEFUL IN BLOOD TREATING PROCESSES

This is a continuation of application Ser. No. 768,002 filed Aug. 21, 1985, now abandoned, which in turn is a combination of Ser. No. 508,024 filed June 27, 1983, now abandoned.

The present invention relates to semi-permeable hollow fibres useful in processes for treating blood, and in particular in artificial kidneys, and in haemodialysis and ultra-filtration apparatus.

Hollow fibres of this type have been described, for example in U.S. Pat. No. 4,056,467. They have excellent mechanical properties together with valuable permeability characteristics for the dialysis and ultrafiltration of blood. They are obtained by a coagulation process involving precipitation of a copolymer from solution with simultaneous extraction of the solvent. However, when these fibres are used, it is necessary to use relatively large amounts of heparin to prevent blood clots from depositing on the internal walls of the hollow fibres.

Hollow fibres which can be used in haemodialysis and haemofiltration have also been obtained from polymers such as polymethyl methacrylate by processes optionally involving thermally reversible gelling, generally accompanied by coagulation. Such processes lead to hollow fibres whose internal surface is generally not very smooth on a microscopic scale, which can lead to loss in performance characteristics during in vivo operation or can require the use of large amounts of heparin.

The present invention provides hollow fibres which avoid some or all of the disadvantages of the prior art fibres. More particularly, the hollow fibres of the invention have improved haemocompatibility, that is to say that they, by their nature and microstructure, do not encourage the attachment of blood clots when they come into contact therewith. Such clots are capable of obstructing, or even completely blocking, the internal channels of other hollow fibres. Thus, when the new fibres are used in apparatus for the treatment of blood, a very uniform circulation of the blood is possible, especially during haemofiltration, when the haematocrit can reach high values locally. The risk of embolism and the required dose of heparin are both reduced, which represents both increased safety for the patient and a saving in cost.

The new hollow fibres may have improved mechanical properties and permeability to constituents of different molecular weights, which can range up to 60,000 daltons and even more if necessary. They also have improved efficiency and reliability.

The process for the manufacture of the new hollow fibres is simple, and has good productivity and reliability.

The semi-permeable hollow fibres of the present invention, which are useful in processes for treating blood, more particularly by haemodialysis and/or by ultrafiltration, and have substantially improved haemocompatibility characteristics, are of the symmetrical type and consist of a copolymer of acrylonitrile and an olefinically unsaturated comonomer carrying sulphonic acid groups which are optionally salified, and have a homogeneous microporous structure with no skin or relatively dense layer on the inside or outside surface. These fibres are essentially obtained by spinning and then lowering the temperature of a solution of the said copolymer until it gels, followed by washing of the fibres so obtained.

Figure 1:
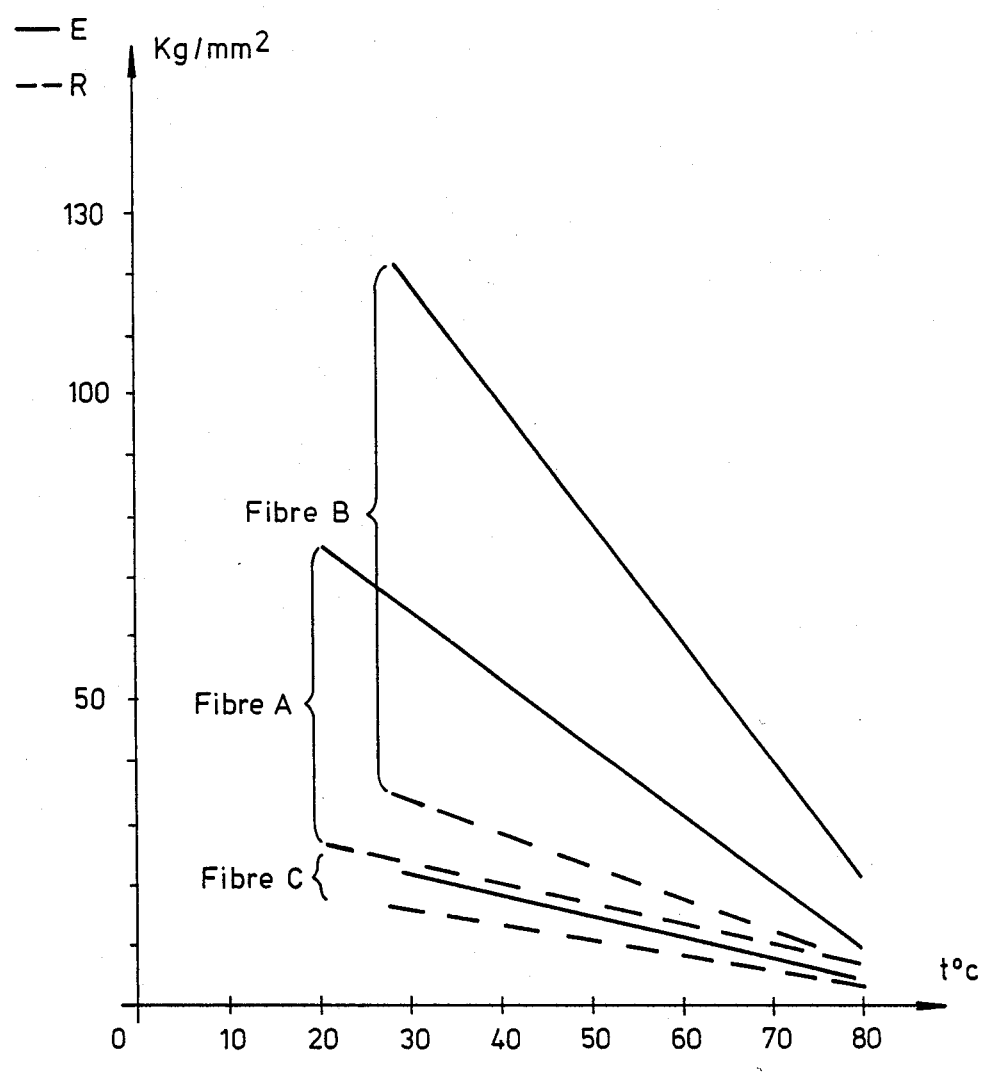
FIG. 1 illustrates the values of T and E as a function of the temperature, for hollow fibers A, B and C immersed in water and non-glycerinated.

The hollow fibres of the invention are obtained by:

(a) forming a spinnable homogeneous solution containing a copolymer of acrylonitrile and an olefinically unsaturated comonomer carrying sulphonic acid groups which may be salified, a polar organic solvent, and an adjuvant, (b) spinning the said solution through a spinneret at a temperature above its gelling point, to form a hollow fibre and cooling the hollow fibre thus formed until it gels, and (c) washing the gelled hollow fibre to remove the non-polymeric residues therefrom.

The composition used in this process essentially contains:

(i) a copolymer of acrylonitrile and an olefinically unsaturated comonomer carrying optionally salified sulphonic acid groups, (ii) a polar organic solvent for the copolymer, and (iii) an adjuvant which is a poor solvent or non-solvent for the copolymer and which is miscible with the solvent and preferably miscible with water.

The sulphonic comonomer for the acrylonitrile copolymer may be a compound of the formula:

$$CHR_1=CR_3-A-Y \qquad (1)$$

in which Y represents $-SO_3H$ or $-SO_3M$, M being a metal atom, preferably of an alkali metal, $R_1$ and $R_3$ each represent hydrogen or methyl; and A represents a valence bond, or a group A' or $-O-A'-$, in which A' represents a saturated or unsaturated, linear or branched divalent aliphatic hydrocarbon group, an unsubstituted aromatic nucleus, or a monoaromatic-monoaliphatic chain in which one of the free valencies is carried by an aliphatic carbon atom and the other by a carbon atom of the aromatic nucleus.

Sulphonic monomers for the acrylonitrile which may be mentioned more specifically are vinylsulphonic, allylsulphonic, methallylsulphonic, styrenesulphonic, vinyloxybenzenesulphonic, allyloxybenzenesulphonic, methallyloxybenzenesulphonic, allyloxyethylsulphonic and methallyloxyethylsulphonic acids and also the salts of these acids, preferably their alkali metal salts.

The proportion of sulphonic comonomer in the acrylonitrile copolymer is generally between 1 and 50% (by number) of sulphonic monomer units, and preferably between 3 and 15%. The acrylonitrile copolymers usually have a specific viscosity (measured at 25° C. in a dimethylformamide solution containing 2 g/liter) of from 0.1 to 3, preferably 0.5 to 1.5.

The solvent used in the composition to be spun is a polar organic solvent or a mixture of polar organic solvents which is capable of forming a spinnable solution with the copolymer of acrylonitrile and sulphonic comonomer. Known solvents for copolymers of acrylonitrile and sulphonic comonomer, which are preferably miscible with water, are generally used as the polar organic solvents. More specifically, there may be mentioned dimethyl sulphoxide, N,N-dimethylacetamide, N-methylpyrrolid-2-one, γ-butyrolactone and especially N,N-dimethylformamide (DMF). The solution can be obtained from a mixture of solvents instead of from a single solvent.

One or more components which are poor solvents or non-solvents for the copolymer and which are miscible with the solvent or mixture of solvents, and preferably miscible with water, are used as adjuvants. The adjuvant facilitates the formation of a thermally reversible gel which is obtained by lowering the temperature of a solution having the composition defined above. It does not contain any component capable of reacting with components of the composition which would lead to the formation of an irreversible gel.

Examples of adjuvants which can be used are ethylene glycol, hexanediol, diethylene glycol and its monoethers such as 2-ethoxyethanol and 2-butoxyethanol, and urea. However, it is preferred to use water and/or especially glycerol because they are non-toxic and convenient to use.

Advantageously, the concentration of glycerol in the composition is adjusted to a level sufficient for the gelling temperature of the composition to be slightly above 100° C. which enables the solutions spun into a gelled hollow fibre to be cooled simply in air at ambient temperature.

In practice, the adjuvants are employed in the composition in amounts such that the concentration by weight of copolymer is generally more than 5% and less than 50%. It is preferably between 20% and 40% by weight. The ratio of solvent to adjuvant is generally from 100/1 to 0.1/1 by weight and is preferably from 10/1 to 1/1.

The temperature of the composition defined in this way is brought to values above the gelling temperature, which is generally from 50° C. to 150° C. and preferably from 90° C. to 130° C.

The various constituents listed above are mixed and the mixture is heated to give a spinnable homogeneous solution. The process can be carried out, in a manner which is in itself known, in any suitable apparatus equipped with heating and stirring means, such as a dissolver or, preferably, an extruder.

The solution prepared in this way can be spun in the form of hollow fibres by various processes which are in themselves known. The spinneret is generally of annular shape. It is preferably arranged along a vertical axis. It also possesses an axial orifice allowing air or inert gas, which is advantageously filtered, to be introduced through the spinneret, thus contributing to the support and uniform shaping of the axial channel of the hollow fibre during formation.

The air or the gas can be introduced at ambient temperature and at a pressure of the order of atmospheric pressure or, advantageously, at a slight overpressure, for example at a relative pressure of less than 500 mm of water.

The semi-permeable hollow fibres of the present invention are essentially obtained by spinning the solution described above at constant rate, most frequently with the aid of an injection pump operating under pressure, and then cooling the spun solution below its gelling point.

The solution is thus converted from the liquid state to the gel state, that is to say to a non-fluid state still impregnated with solvent. In fact, all the components of the initial solution are retained in the gel. Slight losses of solvent or non-solvent by evaporation may possibly be observed, but these losses are generally not disadvantageous.

The essential factor in the conversion of this solution is the lowering of its temperature, which results in a gradual increase in its viscosity and also in the appearance of elastic properties, and which leads to a non-fluid uniform mass capable of retaining its shape under its own weight. This conversion could be reversed, if necessary.

The cooling can preferably be obtained simply by contact with the atmosphere, or by the forced circulation of air, cooled beforehand if appropriate, or by the action of any other fluid—liquid or gaseous—which is inert and immiscible with the constituents of the solution during gelling.

In a preferred embodiment, the solution flows vertically from the spinneret during the gelling process. It is not until the hollow fibre has reached a sufficient state of solidification, enabling it to be subjected to mechanical stress while retaining its shape, that it is generally taken over by a mechanical system comprising, in particular, one or more drive rollers. In practice, the distance, and preferably the height, between the spinneret and the first mechanical element coming into contact with the hollow fibre after gelling is generally between 1 cm and 10 meters and preferably between 50 cm and 3 meters.

Advantageously, the hollow fibre is wound around a first drive roller, which is caused to rotate at a constant speed such that it exerts a so-called primary longitudinal stretching on the hollow fibre as soon as it leaves the spinneret, when the composition is still in the fluid state.

It is observed that this primary stretching results in a simultaneous reduction in the internal and especially external diameters of the hollow fibre, and hence in a substantial reduction in its thickness. It is thus possible to obtain fine hollow fibres using spinnerets having one or more relatively wide, annular orifices, which simplifies their construction and improves the uniformity of their operation. Moreover, the production rate of the hollow fibre can be increased considerably. The primary stretching ratio is in fact generally from 1/1 to 20/1 and preferably from 2/1 to 10/1.

This reduction in the thickness of the wall of the hollow fibre assists rapid cooling of the composition. This conversion leads to a homogeneous microporous structure without a skin, the pores still being impregnated with the solvent and adjuvant components. They are then removed by washing.

The microporous structure obtained according to the present invention is formed, in the gel state, of a mass which has on the whole retained all the constituents of the initial solution, in contrast to the processes involving either evaporation of the solvent or extraction of the solvent from a polymer solution by a coagulating agent (a non-solvent for the polymer, miscible with the solvent). The use of a coagulant is therefore advantageously avoided in the present invention.

The non-polymeric residues, in particular the solvent and the adjuvant, are removed by washing the hollow fibre while it is in the gel state, that is to say non-fluid, by immersing it in a washing bath. It will be noted that this bath could only have a coagulating effect insofar as the hollow fibre was still in the fluid state and not yet converted to gel.

This washing can be carried out in one or more steps including a second treatment by so-called "secondary" stretching. The washing bath used can be an aqueous mixture of organic solvents, in particular of alcohols such as methanol, but it is preferred to use pure water. Generally, the temperature of the washing bath or baths is from 0° to 100° C. and preferably from 10° to 50° C. The residence time of the hollow fibre in the washing bath or baths is generally from 5 seconds to 5 minutes and preferably from 30 seconds to 2 minutes.

The washing treatment before secondary stretching generally has the effect of increasing the rigidity of the hollow fibre and of reducing its permeability somewhat, which shows that there is no substantial coagulation process.

Advantageously, the porosity of the hollow fibres is increased and their permeability is thus adjusted in the desired range, depending on the application envisaged, by subjecting them to a further, so-called secondary, longitudinal stretching. This stretching is carried out when the hollow fibre is immersed in an aqueous medium, for example water or a water/solvent mixture. The temperature of the stretching bath is generally from 50° C. to 100° C. and preferably from 80° C. to 100° C. The secondary stretching ratio is generally from 1/1 to 10/1 and preferably from 1.5/1 to 6/1.

To provide the stretched fibres with a good dimensional stability on storage, it is necessary to subject them to a relaxation treatment. To do this, they are passed through one or more baths of water, the temperature of which is above the use and/or storage temperature of the fibre. Generally, the temperature of the bath or baths is from 40° C. to 100° C. and preferably from 80° C. to 100° C. The hollow fibre is generally guided between the inlet and outlet of the bath by rollers, the relative speeds of which are adjusted so that the fibre is constantly kept immersed and slack.

This relaxation bath also makes it possible to carry out an additional washing of the hollow fibre and to remove the traces of non-polymeric residues. The residence time of the hollow fibre in the relaxation and/or washing bath is generally less than one minute.

The new hollow fibres must be stored in the wet state in an aseptic medium, for example in aqueous formaldehyde solution. They can also be impregnated with a water-retention agent, such as ethylene glycol or, preferably, glycerol, by techniques which are in themselves known.

The selectively permeable hollow fibres of the invention are of the symmetrical type and have a homogeneous microporous structure which is substantially uniform throughout their thickness. The average diameter of the micropores is generally less than 100 Å, this average diameter being determined by the method of D. M. Green et al., described in TRANS. AMER. SOC. ARTIF. INT. ORGANS, page 627 et seq., 1976. Moreover, the void factor is most frequently from 40% to 85% and preferably from 60% to 80%. The hollow fibres are generally free of vacuoles (empty spaces included in the wall and having a largest dimension of more than about 5 microns). They do not possess a skin or a dense layer on the surface, either on the inside or on the outside.

The external diameter of the hollow fibres is generally from 50 to 2,000 microns and preferably from 100 to 500 microns. The wall thickness is generally from 3% to 30% of the external diameter, that is to say generally from 5 to 200 microns and preferably from 10 to 80 microns.

The walls, and especially the internal walls, of the new hollow fibres have a remarkably smooth, continuous and homogeneous surface condition on the microscopic scale, even at very high magnification.

The present invention makes it possible, surprisingly, to obtain hollow fibres virtually devoid of roughnesses, either as pits or in relief, and in particular of roughnesses exceeding a height of about 0.3 micron relative to the average surface, as distinct from the hollow fibres obtained according to U.S. Pat. No. 4,056,467.

Moreover, such roughness, if they exist, remain the exception; for example, the interior of each fibre of a haemodialyser as described in the Examples below possesses at most only one or two roughnesses of this kind. Preferably, the internal surface of the hollow fibres of the invention possess non-uniformities of relief, the height (or depth) of which does not exceed 0.1 micron. Moreover, such non-uniformities of relief do not generally have a sharp edge or an acute angle on the microscopic scale, but constitute microundulations, which are frequently anisotropic in the plane of the surface of the hollow fibre and progressively joined together in a continuous manner.

If the average height of these undulations is designated by h and their average width by 1, it is observed that the hollow fibres of the invention have an internal wall for which the ratio h/1 is generally less than 25% and preferably less than 15%.

It is believed that the excellent condition of the internal surface of the hollow fibres of the present invention makes a very substantial contribution towards reducing the risk of adhesion of platelets to the walls, the platelets having dimensions of the order of 2 microns. The formation of clots, possibly capable of subsequently causing thromboses, is thus avoided or considerably retarded.

The following Examples illustrate the invention. Examples Nos. 6, 7 and 8 show a better haemocompatibility of the hollow fibres of the invention, which produce relatively much better results in experiments carried out in vivo.

EXAMPLE 1

The following are introduced into a dissolver under a nitrogen atmosphere:
- 210 g of an acrylonitrile/sodium methallylsulphonate copolymer containing 3.2% by number of sulphonic comonomer, the specific viscosity of the copolymer being 0.95,
- 312 g of N,N-dimethylformamide, and
- 78 g of 2-butoxyethanol.

The mixture is stirred for 2 hours and heated to 145° C., and the stirring is continued for a further 2 hours. The stirring is stopped to prevent the entrainment of bubbles, and the composition obtained is introduced by means of a gear pump into a spinneret with an annular slit of diameter 860/590 microns, provided with an axial orifice of diameter 370 microns for the introduction of air, the assembly being equipped with heating means keeping the composition at a temperature of 128° C.

The hollow fibre formed travels vertically downwards over a distance of 160 cm in the atmosphere, during which a solid gel is formed which is capable of winding around guiding and primary stretching rollers without suffering permanent deformation.

The hollow fibre is then subjected to a secondary stretching with immersion in a bath of water at 98° C., and then successively to a first washing with water at ambient temperature, to a stabilisation treatment by immersion in a bath of water at 95° C., and to a second washing with water at ambient temperature, after which it is stored in the wet state on reels.

If the process according to the present invention and the process according to U.S. Pat. No. 4,056,467 are carried out successively under conditions which are as similar as possible, in particular using identical spinnerets, the operating conditions and the results obtained are as shown in Table I below:

TABLE I

|  | ACCORDING TO THE INVENTION | ACCORDING TO U.S. Pat. No. 4,056,467. |
|---|---|---|
| Output of gear pump | 1.75 cm$^3$/minute | 3.5 cm$^3$/minute |
| Air flow | 6.2 cm$^3$/minute | — |
| Speed at spinneret outlet | 5.8 m/minute | — |
| Speed of take-up of gel or coagulated fibre | 29 m/minute | 9 m/minute |
| Stretching ratio (secondary) after stabilisation | 2.3 | 2.2 |
| Thickness of fibres and external diameter/internal diameter | 22μ (280/236)μ | 74 (443/295) |
| Ultrafiltration capacity |  |  |
| Flow of saline (9 g/liter of NaCl) at 20° C. under 0.5 bar | 265 liters/day. m$^2$ | 150 liters/day. m$^2$ |
| Bovalbumin rejection factor | 100% | 100% |

It is thus observed that the present invention makes it possible to obtain, with a much better productivity (29 m/minute compared with 9 m/minute starting from half the flow of solution), a thinner hollow fibre having a higher ultrafiltration factor and also a 100% bovalbumin rejection factor.

EXAMPLE 2

3 hollow fibres are prepared in succession, namely a hollow fibre A according to the invention, under the conditions of Example 1, a hollow fibre B according to the invention, under the conditions of Example 1 but with an additional secondary stretching similar to the previous one, and finally a hollow fibre C according to U.S. Pat. No. 4,056,467.

For glycerinated fibres, the operating conditions and the results obtained are as shown in Table II below:

TABLE II

|  | FIBRE A | FIBRE B | FIBRE C |
|---|---|---|---|
| Primary stretching ratio | 2.6 | 2.6 | — |
| 1st secondary stretching ratio | 3.8 | 1.9 | 4 |
| 2nd secondary stretching ratio | — | 2.4 | — |
| Stabilised overall stretching ratio | 3.05 | 3.8 | 2.9 |
| Thickness of the fibre external diameter/internal diameter | 32μ (298/234) | 31μ (313/251) | 76μ (440/288) |
| Flow of saline (9 g/liter of NaCl) at 40° C. in liters/day./m$^2$ under 0.5 bar | 218 | 189 | 160 |
| Mechanical characteristics: |  |  |  |
| Modulus of elasticity, E (kg/mm$^2$) | 49 | 60 | 34 |
| Elongation at break, % | 38 | 30 | 58 |
| Tensile strength, T (kg/mm$^2$) | 3.4 | 4.5 | 1.45 |

FIG. 1 shows the values of T and E as a function of the temperature, for hollow fibres A, B and C immersed in water and non-glycerinated. First, a distinct superiority, from the point of view of the mechanical strength, of the fibres A and B according to the invention over the fibre C is observed. Secondly, it is observed that the additional stretching undergone by fibre B very substantially improves its mechanical properties, but at the expense of a slight drop in the ultrafiltration rate.

EXAMPLE 3

1,050 g of the copolymer according to Example 1,
1,560 g of N,N-dimethylformamide, and
390 g of 2-butoxyethanol;
are suitably mixed for 6 hours at a temperature of 50° C. and the mixture is introduced into an extruder equipped with a feed screw of diameter 2.5 cm and length 50 cm.

The extruder feeds a proportioning pump which discharges into a spinneret having an annular orifice of diameter 1,200/860 microns, with the introduction of axial air through an orifice of diameter 500 microns, the assembly being thermostatically controlled at 125° C.

The speed of the hollow fibre after the primary stretching is 20 m/minute and the primary stretching ratio is 4. The secondary stretching ratio in water at 98° C. is 3.8, which is brought down to 2.4 after stabilisation in water at 98° C. This gives a hollow fibre having an internal diameter of 302 microns, with a thickness of 50 microns.

A haemodialyser is constructed which consists essentially of a bundle of 5,000 fibres having a useful area of 0.86 m$^2$. The following are measured:
the vitamin B12 clearance: K=60 ml.minute$^{-1}$, and
the ultrafiltration gradient, that is to say: UF=31 ml×hour$^{-1}$×mm Hg.

EXAMPLE 4

The same composition as in Example 3 is subjected to a primary stretching ratio of 4. The speed of the solution leaving the spinneret is 25 m/minute. The secondary stretching ratio is 4, which is brought down to 2.8 after stabilisation in water at 98° C.

A haemodialyser is constructed which consists of a bundle of 6,000 hollow fibres having a useful area of 1.14 m$^2$. The fibres have an internal diameter of 290 microns and a thickness of 50 microns. The following are measured:
the urea clearance: K=168 ml×minute$^{-1}$,
the B12 clearance: K=79 ml×minute$^{-1}$, and
the ultrafiltration gradient: UF=44 ml×hour$^{-1}$×mm Hg.

These performance characteristics obtained in vitro compare favourably with those produced by the best haemodialysers currently available.

EXAMPLE 5

A hollow fibre according to the present invention is prepared under the same conditions as those of Example No. 4, but the 2-butoxyethanol is replaced by the same amount of glycerol. Furthermore, a reference hollow fibre, with the same polymer composition, is prepared under the conditions of U.S. Pat. No. 4,056,467.

Figure 2:
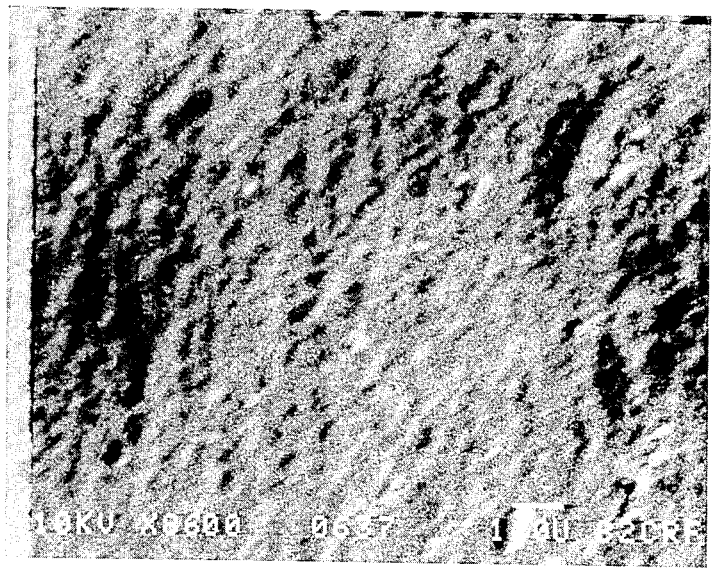
FIG. 2 is a scanning election microscope photograph of the internal wall of a hollow fiber of this invention.

FIG. 2 shows a photograph, obtained on a scanning electron microscope (magnification 8,600×), of a sample of the internal wall of the hollow fibre prepared in this way, according to the invention.

Figure 3:
FIG. 3 is a scanning election microscope photograph of the internal wall of a reference hollow fiber.

FIG. 3 shows a photograph, obtained under the same conditions and with the same magnification, of a sample of the internal wall of the reference hollow fibre.

At this very high magnification, it is noted that the hollow fibre according to the invention has a continuous smooth surface virtually devoid of roughnesses, whereas the reference hollow fibre has a rough surface showing discontinuities. The white line in the bottom right-hand corner of each photograph corresponds to a length of one micron.

EXAMPLE 6

Two haemodialysers, A and B, are prepared.

Haemodialyser A comprises 5,000 hollow fibres with a useful length of 21 cm and external/internal diameters of 336/262 microns, obtained by extruding a composition similar to that of Example 3, in which the 2-butoxyethanol has been replaced by the same amount of glycerol, with a speed after primary stretching of 16 m/minute and a secondary stretching ratio of 4.7, which is brought down to 2.8 after stabilisation.

Haemodialyser B is used as a control. It is similar to the previous haemodialyser and differs therefrom only in the hollow fibres, which have external/internal diameters of 450/300 microns and are prepared according to U.S. Pat. No. 4,056,467.

A haemodialysis treatment is carried out for 3 hours on a heparin-treated dog weighing 20 kg, the two haemodialysers, A and B, being arranged and fed simultaneously in parallel.

A blood flow of 200 ml/minute and an ultrafiltration rate of 10 ml/minute are maintained in each haemodialyser and the amounts of heparin are adjusted to give a simultaneous and continuous operation of the two haemodialysers, while the haematocrit rises from 27% to 32%.

It is observed that, during the experiment, the pressure loss in the blood circuit across haemodialyser A always remains less than 20 mm Hg, while for haemodialyser B, it rises very rapidly to 250 mm Hg and then remains above 180 mm Hg.

Moreover, after rinsing with 500 ml of physiological saline, haemodialyser A is clean, while the ends of the hollow fibres of haemodialyser B remain covered with fibrin.

EXAMPLE 7

A haemodialyser C is prepared which comprises 6,000 hollow fibres with a useful length of 21 cm and external/internal diameters of 400/300 microns, obtained by extruding a composition similar to that used in the preparation of haemodialyser A of Example 6, but with a speed after primary stretching of 25 m/minute and a secondary stretching ratio of 4, which is brought down to 2.6 after stabilisation.

The reference haemodialyser D is a widely used apparatus; it is a C-DAK-1.3 D model equipped with cellulose acetate hollow fibres having a useful area of 1.3 m², sold by the American Company CORDIS DOW CORPORATION.

A haemodialysis treatment is carried out on a dog weighing 20 kg, under conditions similar to those of Example 6, haemodialysers C and D being arranged in parallel.

It is observed that, during the 3 hour treatment, the pressure loss in the blood circuit across haemodialyser C remains between 20 and 30 mm Hg, while for control haemodialyser D, it rises rapidly to 60 mm Hg and then stays between 55 and 60 mm Hg.

After rinsing of the haemodialysers, the following residual volumes of blood are moreover observed:
14 ml for haemodialyser C
23 ml for haemodialyser D.

It will be noted that these figures are high because they refer to an experiment on a dog with a relatively high haematocrit increasing from 29% to 39%.

EXAMPLE 8

A haemodialyser E is prepared which comprises 6,000 hollow fibres with a useful length of 21 cm and external/internal diameters of 390/290 microns, obtained in a manner similar to the preceding example.

The control haemodialyser F is a type B2M FILTRYZER apparatus equipped with polymethyl methacrylate hollow fibres, sold by the Japanese Company TORAY INDUSTRIES INC.

The process is carried out under conditions similar to those of Example 7, and it is observed that the pressure loss in the blood circuit across haemodialyer E remains between 20 and 27 mm Hg, while for control haemodialyser F, it rises gradually to 50 mm Hg and stays above 45 mm Hg. The residual volumes of blood after rinsing are respectively 1.9 and 3.6 ml for haemodialysers E and F.

I claim:

1. In a semi-permeable hollow fibre of the symmetrical type consisting of a copolymer of acrylonitrile and a olefinically unsaturated comonomer carrying sulphonic acid groups, and having a homogeneous microporous structure, with no skin or relatively dense layer on the inside and outside surface, the improvements which comprises, an internal surface which is smooth, continuous and homogeneous on a microscopic scale, being virtually devoid of roughness which constitutes microundulations having a height of more than 0.3 micron relative to the average surface.

2. Hollow fibre according to claim 1, wherein said sulphonic acid groups are salified.

3. Hollow fibre according to claim 1 having an internal surface which is continuous and possesses, on the microscopic scale, only microundulations having a ratio of h/1 wherein h is the average height and 1 is the average width of less than 25%.

4. Hollow fibre according to claim 1, having a void factor of 40 to 85% and an average pore diameter less than 100 Å.

5. Hollow fibre according to claim 1 having an external diameter of 100 to 500 microns, and a wall thickness of 10 to 80 microns, the wall thickness being 3 to 30% of the external diameter.

6. Hollow fibres according to claim 1 made of a copolymer of acrylonitrile and sodium methallylsulphonate.

* * * * *